US009612494B2

(12) United States Patent
Kim et al.

(10) Patent No.: US 9,612,494 B2
(45) Date of Patent: Apr. 4, 2017

(54) LIQUID CRYSTAL DISPLAY

(71) Applicant: SAMSUNG DISPLAY CO., LTD., Yongin, Gyeonggi-Do (KR)

(72) Inventors: Young Min Kim, Yongin-si (KR); Jae Byung Park, Seoul (KR); Hae Il Park, Seoul (KR); Mun-Ki Sim, Seoul (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 31 days.

(21) Appl. No.: 14/257,275

(22) Filed: Apr. 21, 2014

(65) Prior Publication Data

US 2015/0077692 A1   Mar. 19, 2015

(30) Foreign Application Priority Data

Sep. 13, 2013   (KR) .................. 10-2013-0110679

(51) Int. Cl.
| | |
|---|---|
| *G02F 1/136* | (2006.01) |
| *G02F 1/1362* | (2006.01) |
| *G02F 1/1337* | (2006.01) |
| *G02F 1/1343* | (2006.01) |

(52) U.S. Cl.
CPC .... *G02F 1/13624* (2013.01); *G02F 1/133707* (2013.01); *G02F 2001/134345* (2013.01)

(58) Field of Classification Search
CPC .............................................. G02F 1/134363
See application file for complete search history.

(56) References Cited

U.S. PATENT DOCUMENTS

| | | | |
|---|---|---|---|
| 6,297,866 B1 * | 10/2001 | Seo et al. .................. 349/141 |
| 6,577,289 B1 | 6/2003 | Asao et al. | |
| 7,855,769 B2 | 12/2010 | Dong | |
| 7,894,031 B2 | 2/2011 | Kim | |
| 2004/0263748 A1 * | 12/2004 | Park et al. ................. 349/141 |
| 2007/0222931 A1 * | 9/2007 | Chang .............. G02F 1/133707 |
| | | | 349/129 |
| 2009/0284673 A1 | 11/2009 | Kim et al. | |
| 2010/0207862 A1 | 8/2010 | Xu et al. | |
| 2012/0127148 A1 | 5/2012 | Lee et al. | |
| 2012/0306731 A1 * | 12/2012 | Iyama et al. ................ 345/87 |
| 2012/0320323 A1 | 12/2012 | Kim et al. | |

FOREIGN PATENT DOCUMENTS

| | | |
|---|---|---|
| JP | 2004-013120 | 1/2004 |
| JP | 2007-212914 | 8/2007 |
| KR | 100448051 | 9/2004 |

* cited by examiner

*Primary Examiner* — James Dudek
(74) *Attorney, Agent, or Firm* — F. Chau & Associates, LLC

(57) ABSTRACT

A liquid crystal display includes a first substrate, a first pixel and a second pixel vertically or horizontally disposed on the first substrate, a second substrate facing the first substrate, a liquid crystal layer including a plurality of liquid crystal molecules and disposed between the first and second substrates, and a first control electrode disposed between the first and second pixel electrodes. The first pixel includes a first pixel electrode, and the second pixel includes a second pixel electrode. The first pixel electrode includes a first plurality of micro branch portions extending in a first direction, and the second pixel electrode includes a second plurality of micro branch portions extending in a second direction. The first direction is different from the second direction.

15 Claims, 13 Drawing Sheets

LIQUID CRYSTAL DISPLAY

CROSS-REFERENCE TO RELATED APPLICATIONS

This application claims priority under 35 U.S.C. §119 to Korean Patent Application No. 10-2013-0110679, filed on Sep. 13, 2013, the disclosure of which is incorporated by reference herein in its entirety.

TECHNICAL FIELD

The present invention relates to a liquid crystal display.

DISCUSSION OF THE RELATED ART

A liquid crystal display includes two display panels on which electric field generating electrodes, such as a pixel electrode and a common electrode, are formed, and a liquid crystal layer disposed between the display panels.

The liquid crystal display displays an image by generating an electric field by applying a voltage to the electric field generating electrodes, changing the alignment of liquid crystal molecules included in the liquid crystal layer, and controlling polarization of incident light.

Referring to a liquid crystal display having a vertically aligned mode, the long axes of liquid crystal molecules in the liquid crystal layer are arranged to be vertical relative to the display panels in a state in which an electric field is not applied. Such a display may have a high contrast ratio and a wide viewing angle.

Referring to a liquid crystal display that uses a super vertical alignment (SVA) mode, a liquid crystal direction may be controlled through vertical and horizontal electric fields using an electrode pattern having a micro slit structure, thereby improving transmittance.

Further, in a liquid crystal display that uses the SVA mode, an electrode may be designed such that it includes multiple liquid crystal directions in one pixel, which may improve control of the liquid crystal direction and display quality.

SUMMARY

Exemplary embodiments of the present invention provide a liquid crystal display with improved transmittance.

According to an exemplary embodiment of the present invention, a liquid crystal display includes a first substrate, a first pixel and a second pixel vertically or horizontally disposed on the first substrate, a first pixel electrode disposed in the first pixel, a second pixel electrode disposed in the second pixel, a second substrate facing the first substrate, and a liquid crystal layer including liquid crystal molecules and disposed between the first substrate and the second substrate. The first pixel electrode includes a first plurality of micro branch portions extending in a first direction, and the second pixel electrode includes a second plurality of micro branch portions extending in a second direction. A first control electrode is disposed between the first pixel electrode and the second pixel electrode. The first direction is different from the second direction.

The first control electrode may be disposed at a same layer as the first pixel electrode or the second pixel electrode.

The first control electrode may be formed of a same material as the first pixel electrode or the second pixel electrode.

A uniform voltage may be applied to the first control electrode or the first control electrode may be a floating electrode.

The liquid crystal display may further include a third pixel and a fourth pixel vertically disposed on the first substrate when the first pixel and the second pixel are vertically disposed on the first substrate. The first pixel and the third pixel may be horizontally disposed, and the second pixel and the fourth pixel may be horizontally disposed. The third pixel may include a third pixel electrode, and the fourth pixel may include a fourth pixel electrode. The third pixel electrode may include a third plurality of micro branch portions extending in a third direction, and the fourth pixel electrode may include a fourth plurality of micro branch portions extending in a fourth direction. The third direction may be substantially the same as (e.g., parallel to) the second direction, and the fourth direction may be substantially the same as (e.g., parallel to) the first direction.

The liquid crystal molecules may have a pretilt direction toward a center of a region including the first pixel, the second pixel, the third pixel, and the fourth pixel.

The region including the first pixel, the second pixel, the third pixel, and the fourth pixel may be a unit region, and the unit region may be repeated in upper, lower, left, and right directions.

The region including the first pixel, the second pixel, the third pixel, and the fourth pixel may be a unit region, the unit region may be repeatedly arranged in a horizontal direction in a first row, and the unit region may be repeatedly arranged in a horizontal direction in a second row. The fourth pixel in the first row and the first pixel in the second row may be adjacently disposed.

The first pixel and the second pixel may receive gate signals from different gate lines.

The liquid crystal display may further include a second control electrode disposed between the first pixel electrode and the third pixel electrode.

The second control electrode may be disposed at a same layer as the first pixel electrode or the third pixel electrode.

The second control electrode may be connected to the first control electrode.

The liquid crystal display may further include a third pixel and a fourth pixel horizontally disposed on the first substrate when the first pixel and the second pixel are horizontally disposed on the first substrate. The first pixel and the third pixel may be vertically disposed, and the second pixel and the fourth pixel may be vertically disposed. The third pixel may include a third pixel electrode, and the fourth pixel may include a fourth pixel electrode. The third pixel electrode may include a third plurality of micro branch portions extending in a third direction, and the fourth pixel electrode may include a fourth plurality of micro branch portions extending in a fourth direction. The third direction may be substantially the same as (e.g., parallel to) the first direction, and the fourth direction may be substantially the same as (e.g., parallel to) the second direction.

The region including the first pixel, the second pixel, the third pixel, and the fourth pixel may be a unit region, the unit region may be repeatedly arranged in a horizontal direction in a first row, and the unit region may be repeatedly arranged in a horizontal direction in a second row. The fourth pixel in the first row and the first pixel in the second row may be adjacently disposed.

The liquid crystal display may further include a second control electrode disposed between the first pixel electrode and the third pixel electrode.

The second control electrode may be disposed at a same layer as the first pixel electrode or the third pixel electrode.

The second control electrode may be connected to the first control electrode.

Each of the first pixel and the second pixel may include less than four domains.

The first pixel and the second pixel may be vertically disposed, and the first pixel electrode and the second pixel electrode may include a first subpixel electrode and a second sub pixel electrode, respectively. Voltages applied to the first subpixel electrode and the second subpixel electrode may be different from each other, and the second subpixel electrode of the first pixel may be adjacent to the first subpixel electrode of the second pixel.

The first control electrode may be disposed between the second subpixel electrode of the first pixel and the first subpixel electrode of the second pixel.

According to exemplary embodiments of the present invention, a small number of domains may be formed in one pixel, and a control electrode may be formed between adjacent pixels, thereby improving transmittance and preventing or reducing display defects such as, for example, stains, from being generated.

Further, according to exemplary embodiments of the present invention, deterioration of definition due to diffraction by a plurality of domains may be prevented or reduced by minimizing the number of domains.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF THE EXEMPLARY EMBODIMENTS

Figure 1:
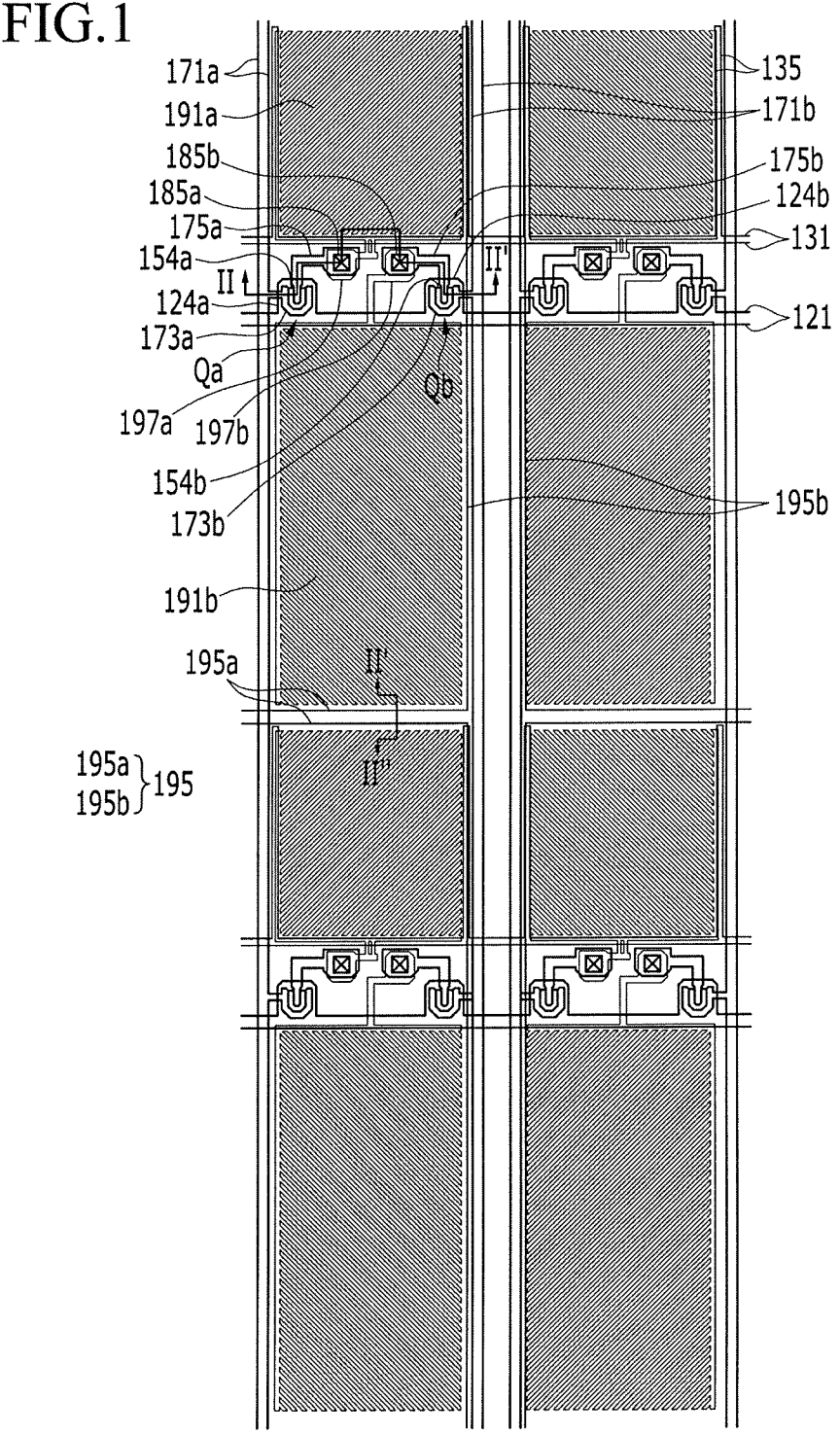
FIG. 1 is a plan view illustrating a liquid crystal display according to an exemplary embodiment of the present invention.

Exemplary embodiments of the present invention will be more fully described herein with reference to the accompanying drawings. Like reference numerals may refer to like elements throughout the accompanying drawings.

In the drawings, the thickness of layers, films, panels, regions, etc., may be exaggerated for clarity. It will be understood that when a layer is referred to as being "on" another layer or substrate, it can be directly on the other layer or substrate, or intervening layers or substrates may also be present.

It will also be understood that although the terms "first," "second," etc., may be used herein to describe various components. These components should not be limited by these terms.

Figure 2:
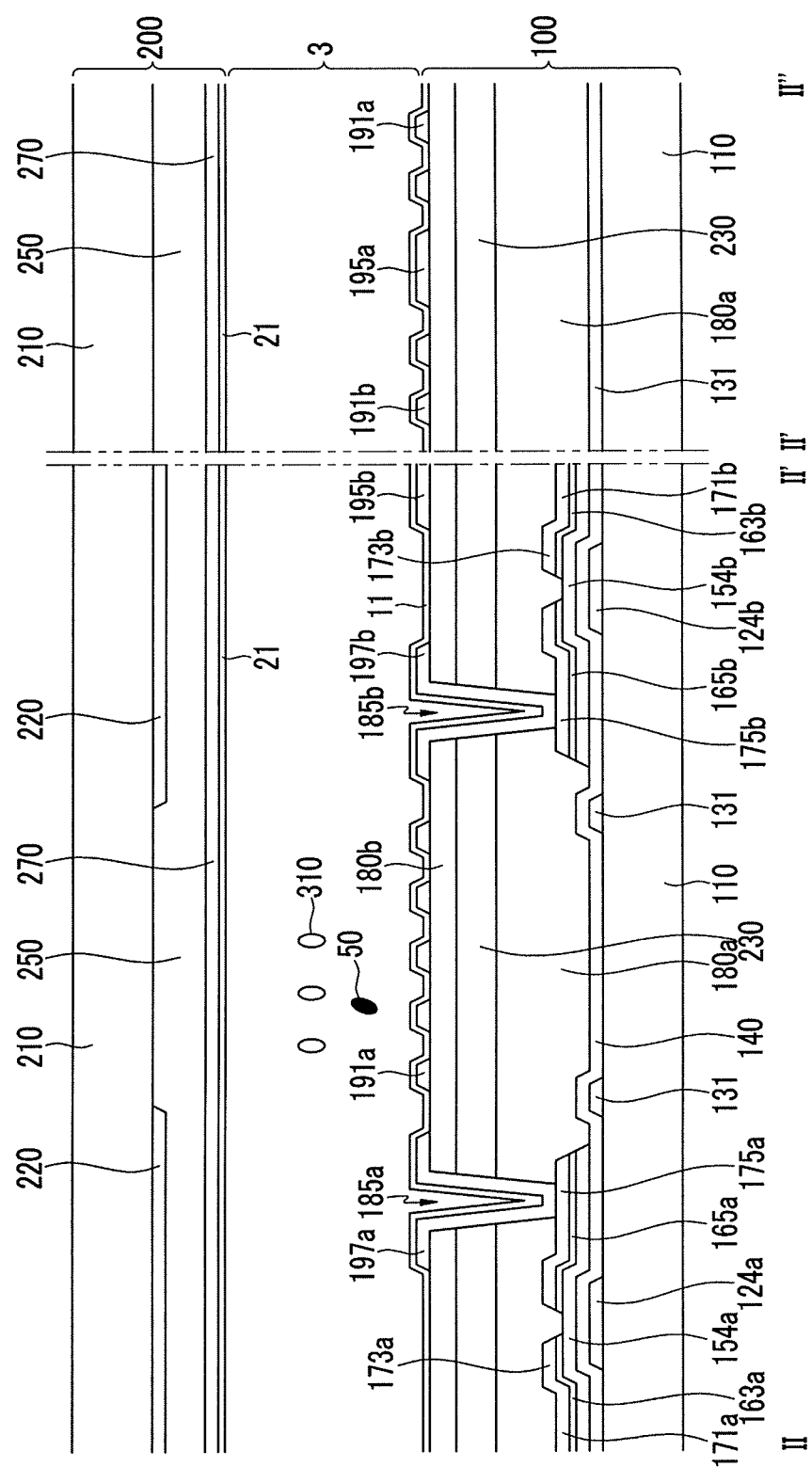
FIG. 2 is a cross-sectional view taken along lines II-II' and II'-II" of FIG. 1.
Figure 3:
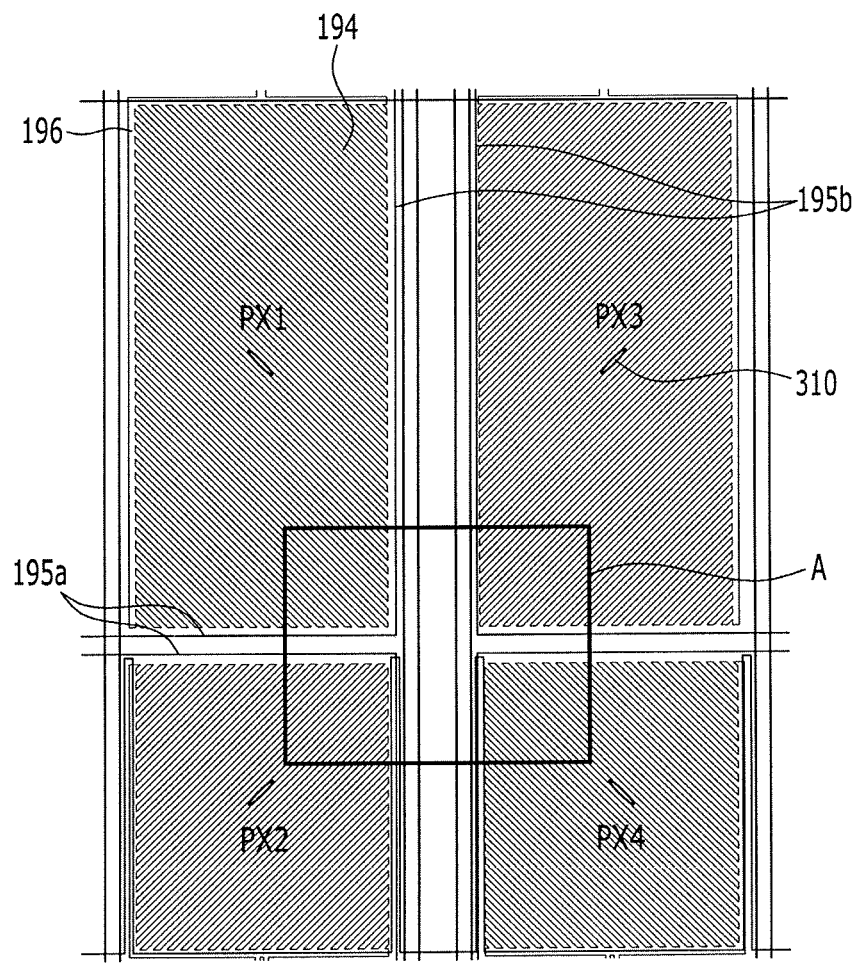
FIG. 3 is a plan view illustrating a part of four adjacent pixels in the liquid crystal display according to an exemplary embodiment of the present invention.

FIG. 1 is a plan view illustrating a liquid crystal display according to an exemplary embodiment of the present invention. FIG. 2 is a cross-sectional view taken along lines II-II' and II'-II" of FIG. 1. FIG. 3 is a plan view illustrating a part of four adjacent pixels in the liquid crystal display according to an exemplary embodiment of the present invention.

Referring to FIGS. 1 and 2, the liquid crystal display according to an exemplary embodiment of the present invention includes a lower display panel 100 and an upper display panel 200. The lower and upper display panels 100 and 200 face each other. A liquid crystal layer 3 is interposed between the two display panels 100 and 200.

The lower display panel 100 is described herein.

A plurality of gate lines 121 and a plurality of storage electrode lines 131 and 135 are formed on a first substrate 110.

The gate lines 121 transmit a gate signal, and extend substantially in a horizontal direction. Each gate line 121 includes a plurality of first and second gate electrodes 124a and 124b which protrude upwardly.

The storage electrode lines include a stem line 131, which extends substantially parallel with the gate line 121, and a plurality of storage electrodes 135 extending from the stem line 131.

The shape and disposition of the storage electrode lines 131 and 135 may vary according to exemplary embodiments.

A gate insulating layer 140 is formed on the gate line 121 and the storage electrode lines 131 and 135, and a plurality of semiconductor layers 154a and 154b formed of, for example, amorphous silicon, crystalline silicon, or an oxide semiconductor, is formed on the gate insulating layer 140.

A plurality of pairs of ohmic contacts 163a, 163b, 165a, and 165b may be formed on the semiconductor layers 154a and 154b, respectively. In an exemplary embodiment, the plurality of pairs of ohmic contacts 163a, 163b, 165a, and 165b may be omitted when the semiconductor layers 154a and 154b are formed of a semiconductor oxide. The ohmic contacts 163a, 163b, 165a, and 165b may be formed of a material such as, for example, silicide or n+ hydrogenated amorphous silicon in which an n-type impurity is doped with a high concentration.

A plurality of pairs of data lines 171a and 171b, a plurality of pairs of first and second source electrodes 173a and 173b connected to the data lines 171a and 171b, and a plurality of pairs of first and second drain electrodes 175a and 175b facing the source electrodes 173a and 173b are formed on the ohmic contacts 163a, 163b, 165a, and 165b and the gate insulating layer 140.

The data lines 171a and 171b transmit data signals, and extend in a vertical direction, crossing the gate line 121 and the stem line 131 of the storage electrode line. The first and second source electrodes 173a and 173b have a shape extended toward the first and second gate electrodes 124a and 124b to be bent in a U-shape, and the first and second source electrodes 173a and 173b face the first and second drain electrodes 175a and 175b based on the first and second gate electrodes 124a and 124b.

Each of the first and second drain electrodes 175a and 175b may include an extended portion having one end, which is partially surrounded by each of the first and second electrodes 173a and 173b, extended upwardly, and an opposite end having a wide area for contacting another layer.

The first and second source electrodes 173a and 173b are formed in a bent shape, such as, for example, a ⊂ shape or a ⊃ shape. The shape and disposition of the first and second drain electrodes 175a and 175b and the data lines 171a and 171b may be modified, and the shape and disposition of the first and second source electrodes 173a and 173b, the first and second drain electrodes 175a and 175b, and the data lines 171a and 171b may be modified.

The first and second gate electrodes 124a and 124b, the first and second source electrodes 173a and 173b, and the first and second drain electrodes 175a and 175b form first and second thin film transistors (TFT) Qa and Qb together with the first and second semiconductors 154a and 154b. Channels of the first and second thin film transistors Qa and Qb are formed on the first and second semiconductor layers 154a and 154b between the first and second source electrodes 173a and 173b and the first and second drain electrodes 175a and 175b.

The semiconductor layers 154a and 154b include spaces between the source electrodes 173a and 173b and the drain electrodes 175a and 175b, and portions which are not hidden by the data lines 171a and 171b and the drain electrodes 175a and 175b to be exposed.

A lower passivation layer 180a formed of, for example, silicon nitride or silicon oxide, is formed on the data lines 171a and 171b, the source electrodes 173a and 173b, the drain electrodes 175a and 175b, and the exposed portions of the semiconductor layers 154a and 154b. The lower passivation layer 180a may be formed of a dual layer formed of, for example, silicon nitride or silicon oxide, as well as a single layer formed of, for example, silicon nitride or silicon oxide.

A color filter 230 may be disposed on the lower passivation layer 180a. The color filter 230 is disposed in most of the regions, except, for example, in regions in which the first and second thin film transistors Qa and Qb are disposed. The color filter 230 may be elongated in a vertical direction along the space between the adjacent data lines 171a and 171b. The color filter 230 may be formed on the lower display panel 100, as shown in FIG. 2, or on the upper display panel 200.

An upper passivation layer 180b is formed on the color filter 230.

The upper passivation layer 180b may be formed of, for example, an organic material or an inorganic material having photosensitivity. In a case in which the upper passivation layer 180b is formed of an organic material, the upper passivation layer 180b may serve to planarize a layer formed at a lower end of the upper passivation layer 180b. In a case in which the upper passivation layer 180b is formed of an inorganic material, the upper passivation layer 180b may serve to improve transmittance through a compensation of a refractive index, or block gas flowing out from the color filter 230.

A first contact hole 185a and a second contact hole 185b, through which the lower passivation layer 180a and the first and second drain electrodes 175a and 175b are exposed, is formed in the upper passivation layer 180b.

A plurality of pixel electrodes 191 is formed on the upper passivation layer 180b. The pixel electrodes 191 may be formed of a transparent conductive material such as, for example, ITO or IZO, or a reflective metal such as, for example, aluminum, silver, chromium, or an alloy thereof.

Each pixel electrode 191 includes first and second subpixel electrodes 191a and 191b separated from each other by a gate line 121 interposed therebetween.

A lower protrusion 197a extending from the lower end of the first subpixel electrode 191a overlaps an expansion of the first drain electrode 175a. Accordingly, the first subpixel electrode 191a and the first drain electrode 175a may be connected through the first contact hole 185a, and as a result, the voltage transmitted through the first drain electrode 175a may be applied to the first subpixel electrode 191a.

A upper protrusion 197b extending from the upper end of the second subpixel electrode 191b overlaps an expansion of the second drain electrode 175b. Accordingly, the second subpixel electrode 191b and the second drain electrode 175b may be connected through the second contact hole 185b, and as a result, the voltage transmitted through the second drain electrode 175b may be applied to the second subpixel electrode 191b.

Herein, when pixels, pixel electrodes, or subpixel electrodes are referred to as being vertically disposed, the pixels, pixel electrodes, or subpixel electrodes may be adjacent to each other in a vertical direction, and/or aligned with each other in a vertical direction. Similarly, when pixels, pixel electrodes, or subpixel electrodes are referred to as being horizontally disposed, the pixels, pixel electrodes, or subpixel electrodes may be adjacent to each other in a horizontal direction, and/or aligned with each other in a horizontal direction.

According to an exemplary embodiment, the liquid crystal display includes a first pixel PX1, a second pixel PX2, a third pixel PX3, and a fourth pixel PX4, which are adjacent to each other. Each pixel includes first and second subpixel electrodes 191a and 191b separated from each other by a gate line 121 interposed therebetween. FIG. 3 shows a portion of four adjacent pixels. For example, a left upper end represents the second subpixel electrode 191b of the first pixel PX1, a left lower end represents the first subpixel electrode 191a of the second pixel PX2, a right upper end represents the second subpixel electrode 191b of the third pixel PX3, and a right lower end represents the first subpixel electrode 191a of the fourth pixel PX4.

Referring to FIG. 3, a first control electrode 195a is disposed between the second subpixel electrode 191b of the first pixel PX1 and the first subpixel electrode 191a of the second pixel PX2, which are vertically disposed. The first control electrode 195a may be disposed at a same layer as the pixel electrode 191, and may be formed of the same material as that of the pixel electrode 191. The first control electrode 195a may be formed of, for example, a transparent conductive material, such as ITO or IZO.

In an exemplary embodiment, the general shape of the first pixel PX1, the second pixel PX2, the third pixel PX3, and the fourth pixel PX4, which are adjacent to each other, is a quadrangle, and the first pixel PX1, the second pixel PX2, the third pixel PX3, and the fourth pixel PX4 include a cross-shaped control electrode 195 formed of the first control electrode 195a and a second control electrode 195b crossing the first control electrode 195a. The pixel electrodes 191 disposed in the first pixel PX1, the second pixel PX2, the third pixel PX3, and the fourth pixel PX4, respectively, include a plurality of micro branch portions 194 extending in an oblique direction. Further, each pixel electrode 191 has an L-shape, and includes a boundary pattern 196 connecting the micro branch portions 194.

In the exemplary embodiment shown in FIG. 3, the micro branch portion 194 of the second subpixel electrode 191b in the first pixel PX1 obliquely extends in a first direction (e.g., a first diagonal direction), the micro branch portion 194 of the first subpixel electrode 191a in the second pixel PX2 obliquely extends in a second direction (e.g., a second diagonal direction), the micro branch portion 194 of the second subpixel electrode 191b in the third pixel PX3 obliquely extends in a third direction (e.g., a third diagonal direction), and the micro branch portion 194 of the first subpixel electrode 191a in the fourth pixel PX4 obliquely extends in a fourth direction (e.g., a fourth diagonal direction). In the exemplary embodiment shown in FIG. 3, the first direction is different from the second direction, the first direction is substantially the same as (e.g., parallel to) the fourth direction, and the second direction is substantially the same as (e.g., parallel to) the third direction, however exemplary embodiments are not limited thereto.

Referring to FIG. 3, the first pixel PX1 may be referred to as including a first pixel electrode, which includes first and second subpixel electrodes 191a and 191b, the second pixel PX2 may be referred to as including a second pixel electrode, which includes first and second subpixel electrodes 191a and 191b, the third pixel PX3 may be referred to as including a third pixel electrode, which includes first and second subpixel electrodes 191a and 191b, and the fourth pixel PX4 may be referred to as including a fourth pixel electrode, which includes first and second subpixel electrodes 191a and 191b. In addition, the first pixel PX1 may be referred to as including a first plurality of micro branch portions 194 extending in a first direction, the second pixel PX2 may be referred to as including a second plurality of micro branch portions 194 extending in a second direction, the third pixel PX3 may be referred to as including a third plurality of micro branch portions 194 extending in a third direction, and the fourth pixel PX4 may be referred to as including a fourth plurality of micro branch portions 194 extending in a fourth direction. The first and second directions may be different from each other, the third direction may be substantially the same as the second direction, and the fourth direction may be substantially the same as the first direction.

When a voltage is applied to each of the pixel electrodes 191 having the pattern shown in FIG. 3 and a common electrode 270 to be described below, a fringe field is generated. As a result, liquid crystal molecules 310 may lie toward a center of the region including the first pixel PX1, the second pixel PX2, the third pixel PX3, and the fourth pixel PX4.

In unexemplary embodiments, a uniform voltage may be applied to the control electrode 195, or the control electrode 195 may be a floating electrode. Utilization of the control electrode 195 may prevent or reduce display defects such as, for example, stains or a texture phenomenon. For example, utilization of the control electrode 195 may prevent the liquid crystal molecules 310 from losing directivity at boundary portions of the adjacent pixels having different domain directions, thus, prevent or reduce display defects.

The upper display panel 200 is described herein.

The upper display panel 200 includes a light blocking member 220 formed on a transparent second substrate 210 having an insulating property.

The light blocking member 220, which may also be referred to as a black matrix, blocks light leakage between the pixel electrodes 191. The light blocking member 220 may include a portion corresponding to the gate lines 121 and the data lines 171a and 171b, and a portion corresponding to the thin film transistors Qa and Qb.

In an exemplary embodiment, the light blocking member 220 may be formed on the first substrate 110 of the lower display panel 100 instead of the second substrate 210 of the upper display panel. In this case, the light blocking member 220 may be primarily disposed between the adjacent color filters 230.

An overcoat 250 is formed on the light blocking member 220. The overcoat 250 may be formed of an insulating material, and provides a flat surface. In an exemplary embodiment, the overcoat 250 may be omitted.

The common electrode 270 is formed on the overcoat 250. The common electrode 270 may have a planar shape in the pixel region. The planar shape may refer to, for example, a continuous plate shape that does not include any breaks or splits. Alignment layers 11 and 21 are disposed on internal surfaces of the lower display panel 100 and the upper display panel 200, respectively. The alignment layers 11 and 21 may be, for example, vertical alignment layers.

Polarizers may be provided on external surfaces of the lower display panel 100 and the upper display panel 200.

The liquid crystal layer 3 is interposed between the lower display panel 100 and the upper display panel 200. The liquid crystal layer 3 includes the liquid crystal molecules 310, which may have negative dielectric anisotropy. Further, the liquid crystal layer 3 may include an alignment polymer 50 formed by light-irradiating the plurality of liquid crystal molecules 310 and an alignment supplement agent. The liquid crystal molecules 310 may have pretilt direction caused by the alignment polymer 50 such that the long axes thereof are about parallel to a longitudinal direction of the micro branch portion 194, and may be aligned to be substantially vertical to surfaces of the two display panels 100 and 200 in a state in which an electric field is not applied to the liquid crystal molecules 310. In an exemplary embodiment, the alignment polymer 50 is not included in the liquid crystal layer 3, and the alignment polymer 50 may instead be included in the alignment layers 11 and 21.

When a voltage is applied to the pixel electrode 191 and the common electrode 270, the liquid crystal molecules 310 respond to the electric field formed between the pixel electrode 191 and the common electrode 270, and the direction of the long axes of the liquid crystal molecules 310 is changed to a direction vertical to the direction of the electric field. A degree in change of polarization of incident light is changed in the liquid crystal layer 3 according to a degree in inclination of the liquid crystal molecules 310, and the change in the polarization is shown as a change in transmittance by the polarizer. The liquid crystal display displays an image through the change in the transmittance.

The inclined direction of the liquid crystal molecules 310 is determined by the micro branch portion 194 of the pixel electrode 191, and the liquid crystal molecules 310 are inclined in a direction substantially parallel to the longitudinal direction of the micro branch portion 194. In the pixel electrode 191 of each of the four adjacent pixels PX1, PX2, PX3, and PX4, the longitudinal directions of the micro branch portions 194 are different from each other, such that the number of inclined directions of the liquid crystal molecules 310 is about four, and four domains having different alignment directions of the liquid crystal molecules 310 are formed between the adjacent pixels in the liquid crystal layer 3. According to exemplary embodiments, a viewing angle of the liquid crystal display may be improved by varying the inclined direction of the liquid crystal molecules 310 as described above.

In the exemplary embodiment described above, the liquid crystal layer 3 or the alignment layers 11 and 21 include the alignment polymer 50, however, exemplary embodiments of the present invention are not limited thereto. For example, in an exemplary embodiment, the alignment layers 11 and 21 may be formed of a light alignment material.

Figure 4:
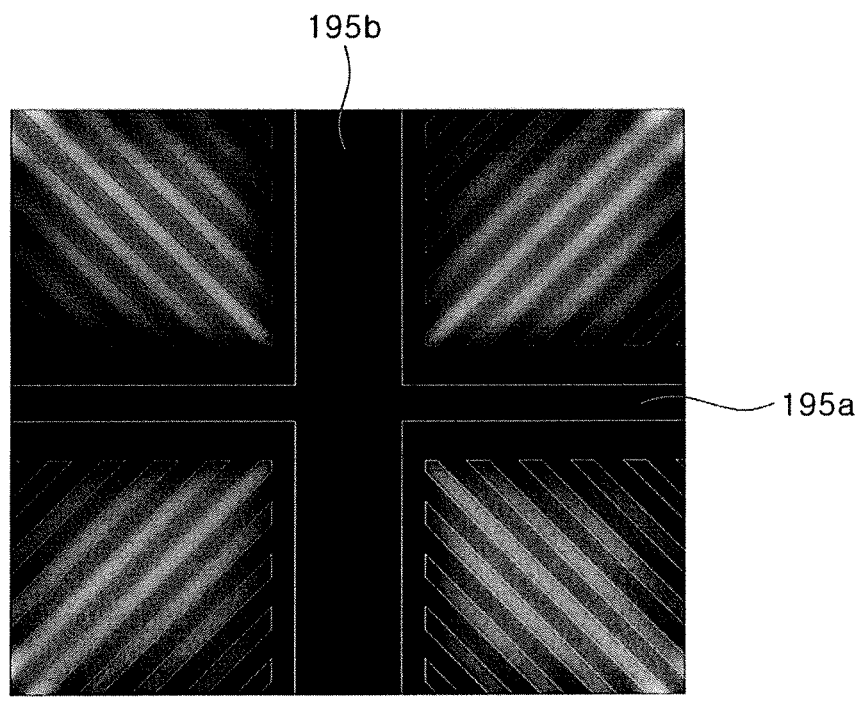
FIG. 4 is an image illustrating a result of an electric field exposure simulation for portion A of FIG. 3.
Figure 5:
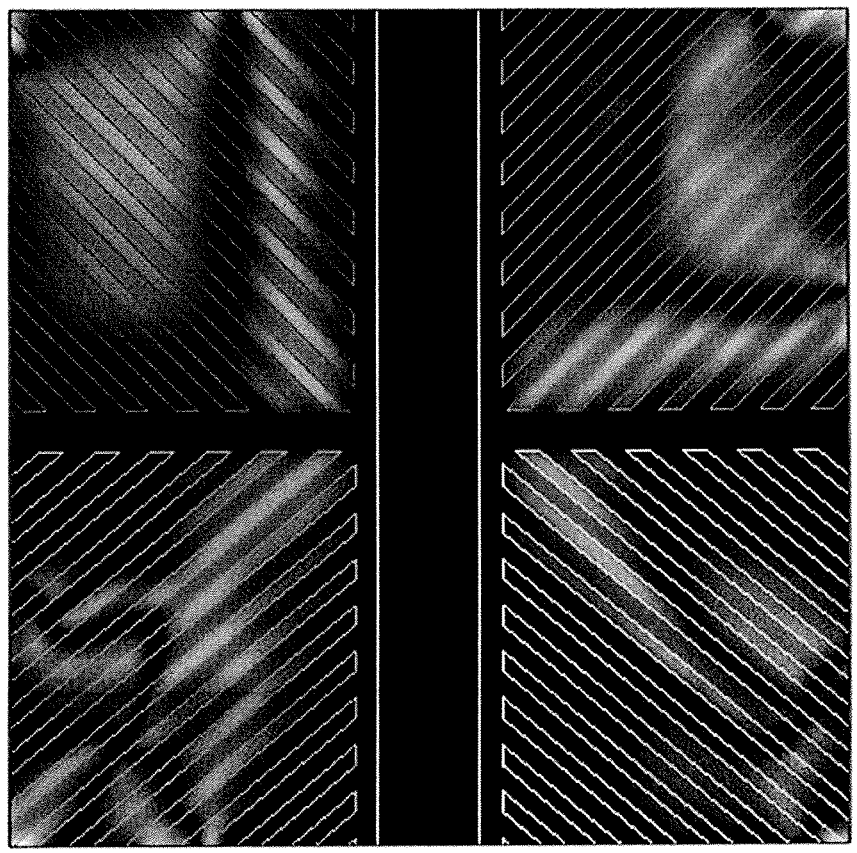
FIG. 5 is an image illustrating a result of an electric field exposure simulation in a state in which a control electrode is not formed between vertically adjacent pixels.

FIG. 4 is an image illustrating a result of an electric field exposure simulation for portion A of FIG. 3. FIG. 5 is an image illustrating a result of an electric field exposure simulation in a state in which a control electrode is not formed between vertically adjacent pixels.

Referring to FIG. 4, in a case in which the control electrode 195 is formed between the adjacent pixels, according to exemplary embodiments of the present invention, a stain does not appear, and a clear image is displayed by the liquid crystal display.

Referring to FIG. 5, in a case in which a control electrode is not formed between vertically adjacent pixels, display defects such as, for example, stains or a texture phenomenon may occur.

Figure 6:
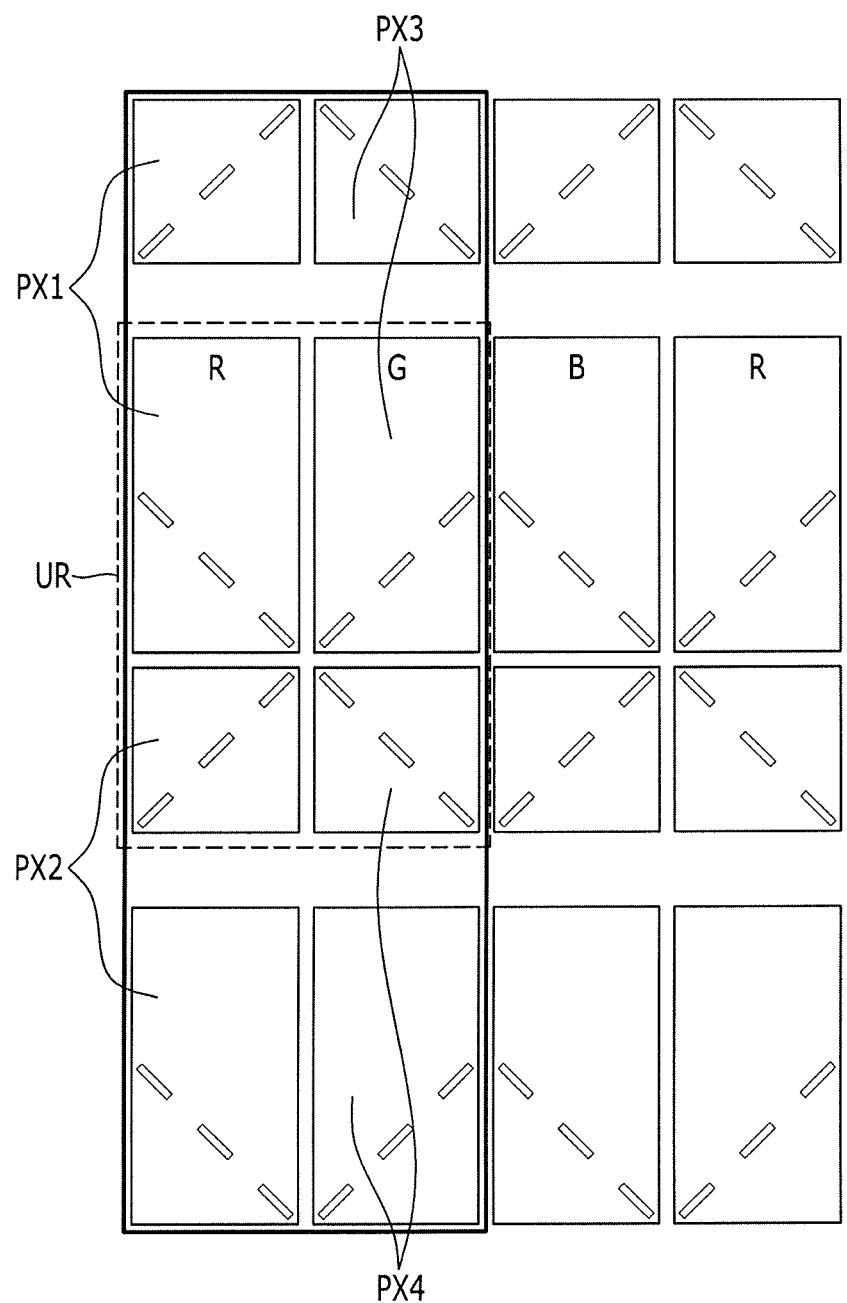
FIG. 6 is a plan view schematically illustrating a liquid crystal direction in each pixel in a liquid crystal display according to an exemplary embodiment of the present invention.

FIG. 6 is a plan view schematically illustrating a liquid crystal direction in each pixel in a liquid crystal display according to an exemplary embodiment of the present invention. In FIG. 6, a dotted line represents a direction in which the liquid crystal molecules are aligned in each region in which the electrode is disposed.

Referring to FIGS. 1 and 6, a region including the first pixel PX1, the second pixel PX2, the third pixel PX3, and the fourth pixel PX4 is referred to as a unit region UR, and unit regions UR are repeatedly arranged in upper, lower, left, and right directions. In the exemplary embodiment shown in FIG. 6, each pixel is divided into subpixel regions corresponding to the subpixel electrodes, and the unit region UR is formed of a second subpixel region of the first pixel PX1, a first subpixel region of the second pixel PX2, a second subpixel region of the third pixel PX3, and a first subpixel region of the fourth pixel PX4. The subpixel regions may correspond to the colors red (R), green (G) and blue (B), however the subpixel regions are not limited thereto.

In the exemplary embodiment shown in FIG. 6, the unit region UR has four domains, and the liquid crystal alignment directions in the respective domains may be converged toward the center of the unit region. The first subpixel region and the second subpixel region included in one pixel may have different liquid crystal alignment directions.

Figure 7:
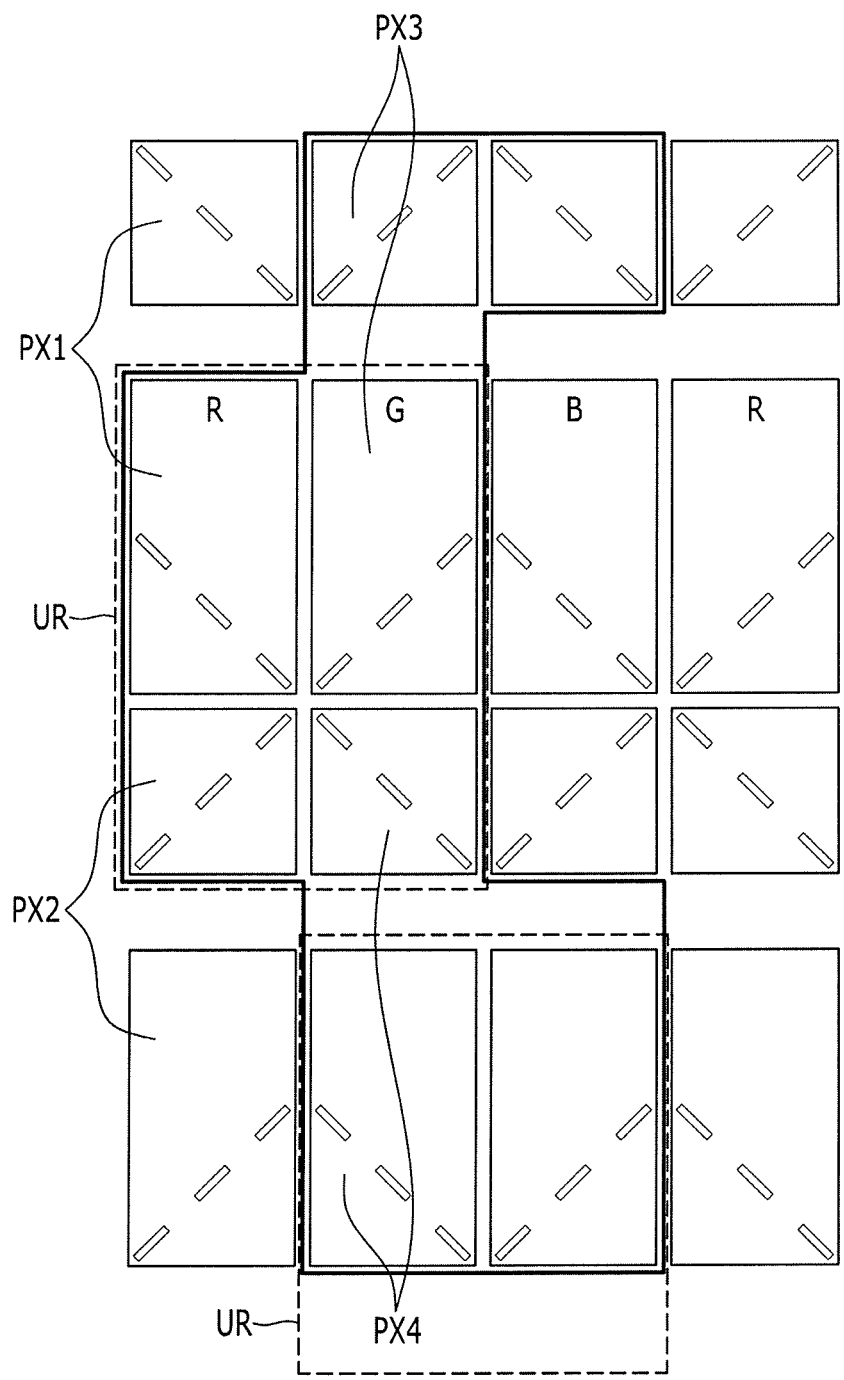
FIG. 7 is a plan view illustrating a modified liquid crystal display of the exemplary embodiment of FIG. 6.

FIG. 7 is a plan view illustrating a modified liquid crystal display of the exemplary embodiment of FIG. 6. A dotted line in FIG. 7 represents a direction in which the liquid crystal molecules are aligned in each region in which an electrode is disposed.

Similar to the exemplary embodiment of FIG. 6, the exemplary embodiment of FIG. 7 includes a unit region UR having four domains in which the liquid crystal alignment directions in respective domains are converged toward a center of the unit region UR.

However, in the exemplary embodiment of FIG. 7, the liquid crystal alignment directions in a first subpixel region and a second subpixel region included in one pixel are substantially the same as each other. For example, the unit regions UR are repeatedly arranged in a horizontal direction in a first row direction, and the unit regions UR are repeatedly arranged in the horizontal direction in a second row vertically adjacent to the first row, and repeated patterns of the first row and the second row are the same as each other. However, the unit region UR in the first row and the unit region UR in the second row are misaligned as illustrated in FIG. 7. For example, a fourth subpixel region in the first row and the first subpixel region in the second row are adjacently disposed.

Figure 8:
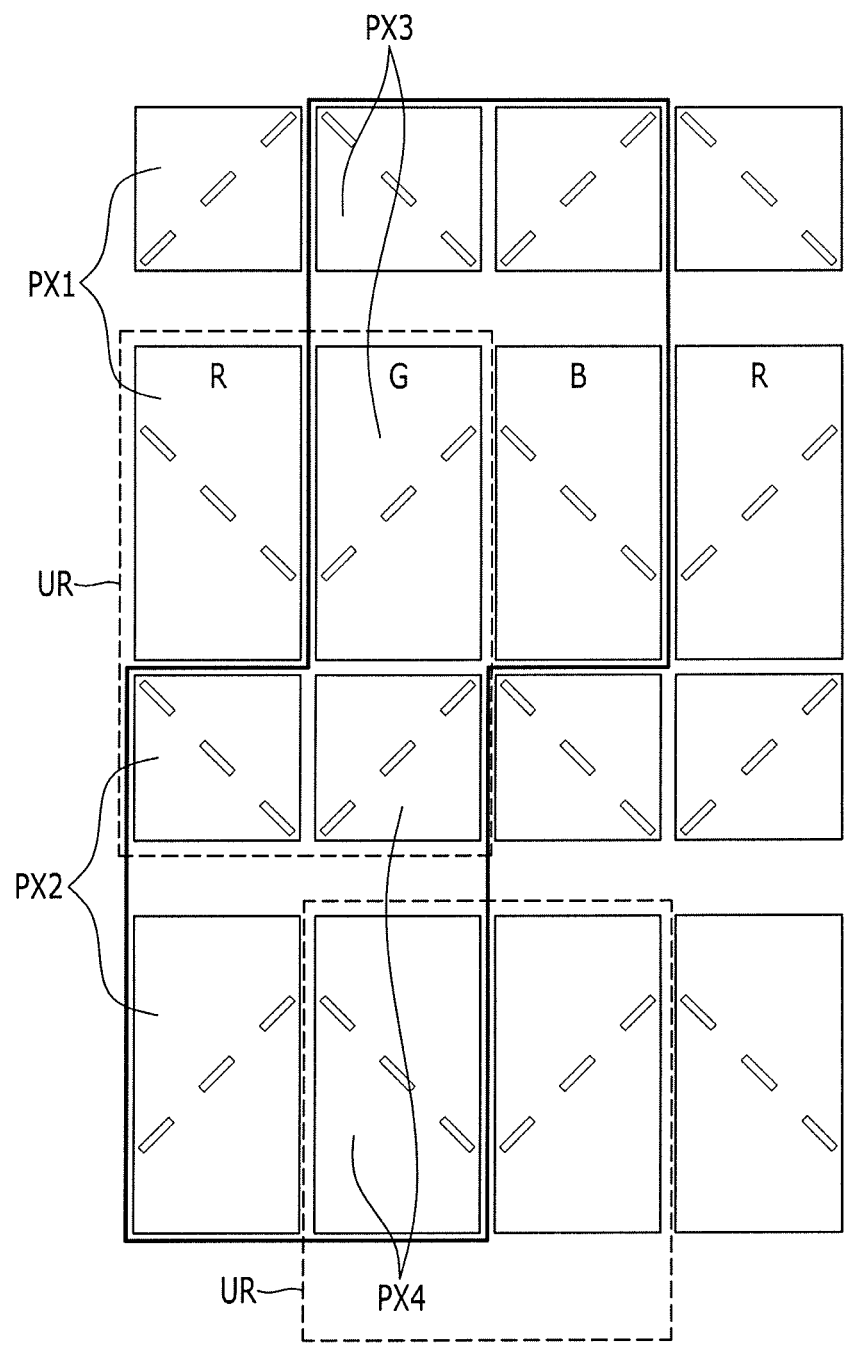
FIG. 8 is a plan view schematically illustrating a liquid crystal alignment in each pixel in a liquid crystal display according to an exemplary embodiment of the present invention.

FIG. 8 is a plan view schematically illustrating a liquid crystal alignment in each pixel in a liquid crystal display according to an exemplary embodiment of the present invention.

Referring to FIGS. 1 and 8, a region including a first pixel PX1, a second pixel PX2, a third pixel PX3, and a fourth pixel PX4 is referred to as a unit region UR, and the unit regions UR are repeatedly arranged in left and right directions. Similar to the exemplary embodiment of FIG. 6, in the exemplary embodiment of FIG. 8, liquid crystal alignment directions are different in a first subpixel region and a second subpixel region included in one pixel. In addition, similar to the exemplary embodiment of FIG. 7, in the exemplary embodiment of FIG. 8, the unit region UR in a first row and the unit region UR in a second row are misaligned. For example, a fourth subpixel region in the first row and the first subpixel region in the second row are adjacently disposed.

Figure 9:
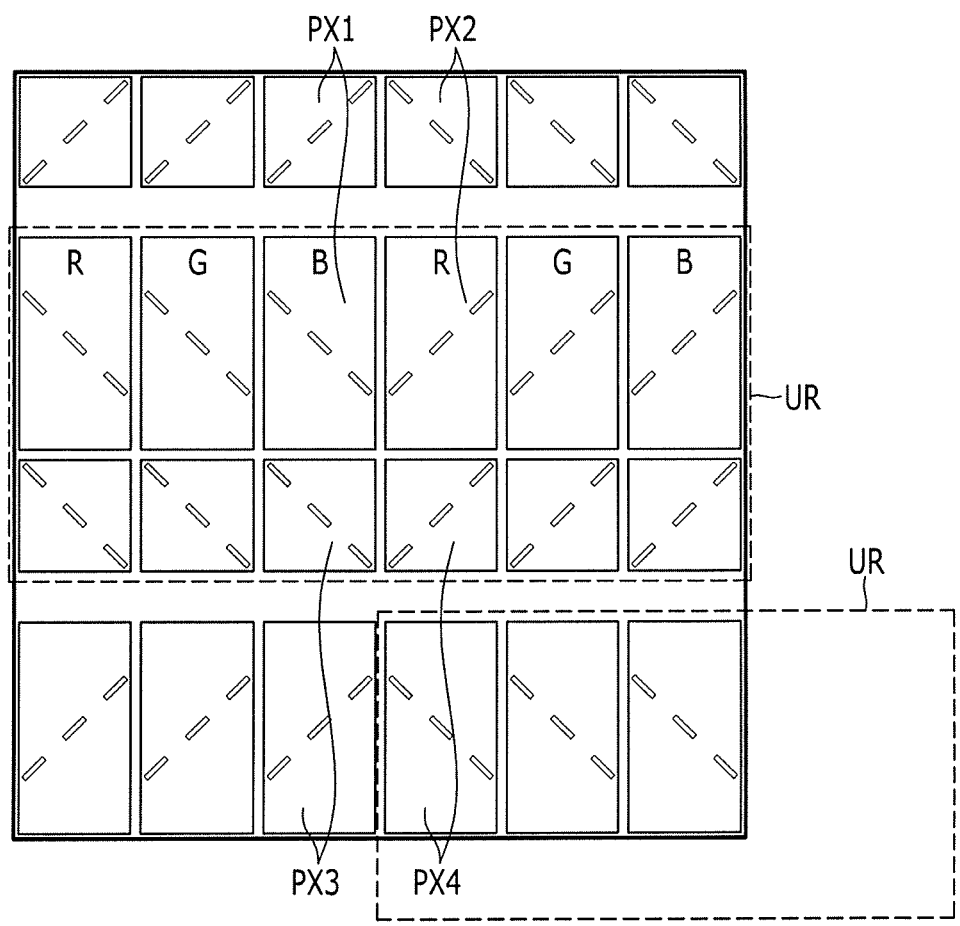
FIG. 9 is a plan view illustrating a modified liquid crystal display of the exemplary embodiment of FIG. 8.

FIG. 9 is a plan view illustrating a modified liquid crystal display of the exemplary embodiment of FIG. 8.

Referring to FIG. 9, two rows and six columns are referred to as one unit region UR, and the unit region UR in the first row and the unit region UR in the second row are misaligned.

Figure 10:
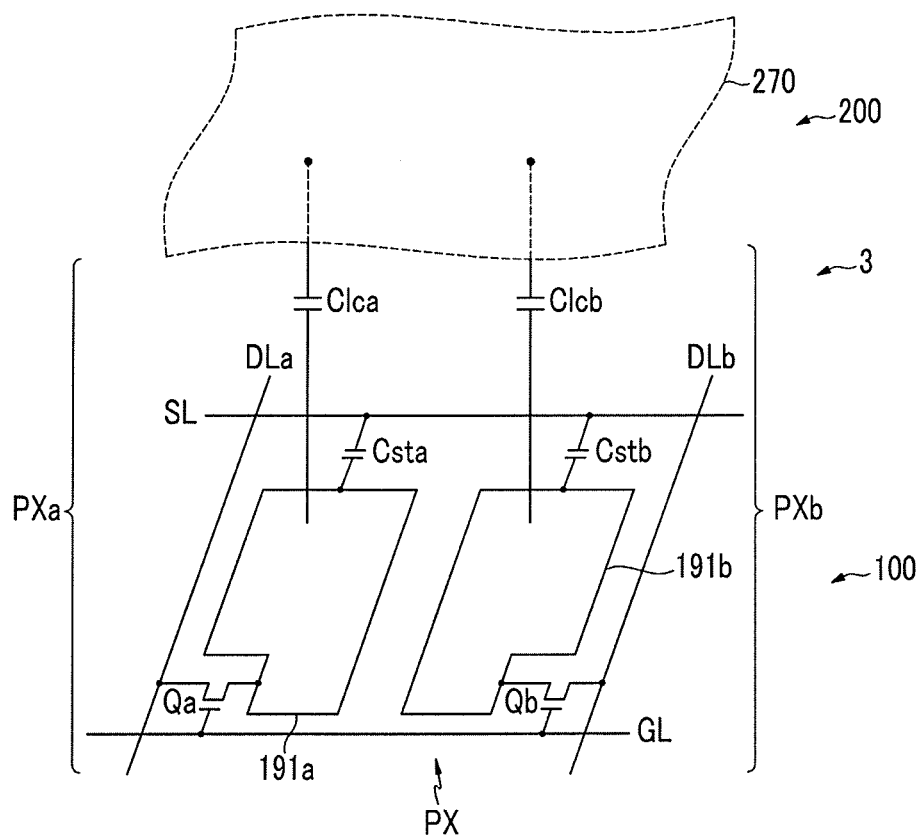
FIG. 10 is an equivalent circuit diagram of a pixel of the liquid crystal display according to the exemplary embodiment of FIG. 1.

FIG. 10 is an equivalent circuit diagram of a pixel of the liquid crystal display according to the exemplary embodiment of FIG. 1.

Referring to FIG. 10, the liquid crystal display according to an exemplary embodiment of the present invention includes the lower display panel 100 (e.g., a thin film transistor display panel) and the upper display panel 200 (e.g., a common electrode display panel), which face each other, and the liquid crystal layer 3 interposed therebetween.

The liquid crystal display includes signal lines including a plurality of gate lines GL, a plurality of pairs of data lines DLa and DLb, and a plurality of storage electrode lines SL. The plurality of pixels PX are connected to the signal lines.

Each pixel PX includes one pair of subpixels PXa and PXb. The subpixels PXa and PXb include switching elements Qa and Qb, liquid crystal capacitors Clca and Clcb, and storage capacitors Csta and Cstb.

The switching elements Qa and Qb are three-terminal elements such as, for example, a thin film transistor, and are provided on the lower display panel 100. Control terminals of the switching elements Qa and Qb are connected to the gate lines GL, input terminals of the switching elements Qa and Qb are connected to the data lines DLa and DLb, and output terminals of the switching elements Qa and Qb are connected to the liquid crystal capacitors Clca and Clcb and the storage capacitors Csta and Cstb.

The liquid crystal capacitors Clca and Clcb are formed by adopting the subpixel electrodes 191a and 191b and the common electrode 270 as two terminals, and adopting a part of the liquid crystal layer 3 between the two terminals as a dielectric body.

The storage electrode line SL and the subpixel electrodes 191a and 191b provided on the lower display panel 100 overlap with an insulating material interposed therebetween, resulting in the formation of the storage capacitors Csta and Cstb, and a predetermined voltage, such as a common voltage Vcom, is applied to the storage electrode line SL.

The voltages charged in the two liquid crystal capacitors Clca and Clcb may be set to be slightly different from each other. For example, a data voltage applied to the liquid crystal capacitor Clca may be set to be lower or higher than a data voltage applied to the liquid crystal capacitor Clcb. By appropriately setting these voltages, the viewing angle of the liquid crystal display may be improved.

Figure 11:
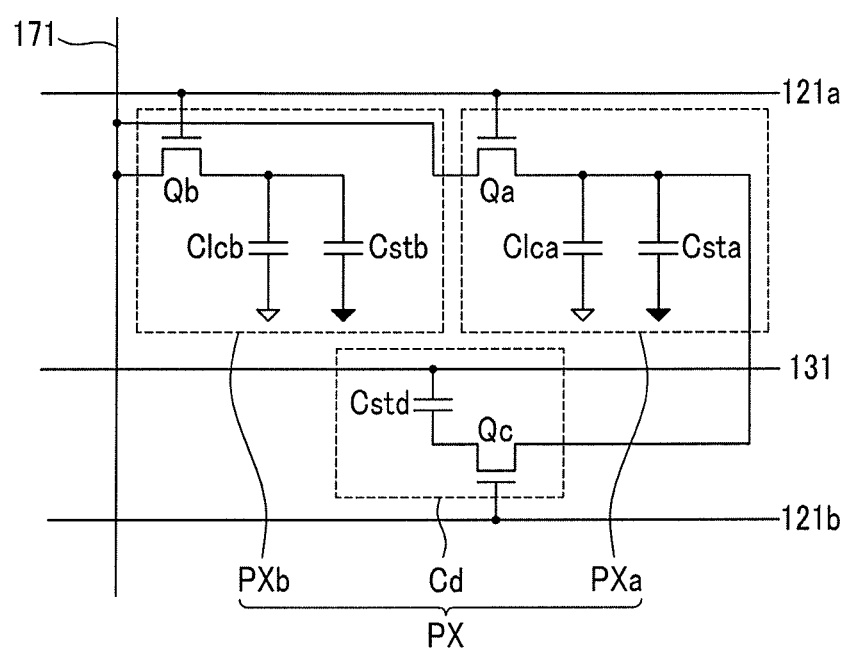
FIG. 11 is an equivalent circuit diagram of a pixel of a liquid crystal display according to an exemplary embodiment of the present invention.

FIG. 11 is an equivalent circuit diagram of a pixel of a liquid crystal display according to an exemplary embodiment of the present invention.

Referring to FIG. 11, the liquid crystal display according to an exemplary embodiment of the present invention includes signal lines including a gate line 121a, a step-down gate line 121b, a storage electrode line 131, and a data line 171, and pixels PX connected to the signal lines.

The pixel PX includes a first subpixel PXa, a second subpixel Pxb, and a step-down unit Cd.

The first subpixel PXa includes a first switching element Qa, a first liquid crystal capacitor Clca, and a first storage capacitor Csta. The second subpixel PXb includes a second switching element Qb, a second liquid crystal capacitor Clcb, and a second storage capacitor Cstb. The step-down unit Cd includes a third switching element Qc and a step-down capacitor Cstd.

The first and second switching elements Qa and Qb are three-terminal elements such as, for example, a thin film transistor, and are provided on a lower display panel. Control terminals of the first and second switching elements Qa and Qb are connected to the gate line 121a, input terminals of the first and second switching elements Qa and Qb are connected to the data line 171, and output terminals of the first and second switching elements Qa and Qb are connected to the first and second liquid crystal capacitors Clca and Clcb and the first and second storage capacitors Csta and Cstb.

The third switching element Qc is a three-terminal element such as, for example, a thin film transistor, and is provided on the lower display panel. A control terminal of the third switching element Qc is connected to the step-down gate line 121b, an input terminal of the third switching element Qc is connected to the first liquid crystal capacitor Clca, and the output terminal of the third switching element Qc is connected to the step-down capacitor Cstd.

The first and second subpixel electrodes 191a and 191b connected to the first and second switching elements Qa and Qb, respectively, overlap a common electrode of an upper display panel, resulting in the formation of the first and second liquid crystal capacitors Clca and Clcb. The storage electrode line 131 overlaps the first and second subpixel electrodes 191a and 191b, resulting in the formation of the first and second storage capacitors Csta and Cstb.

The step-down capacitor Cstd is connected to an output terminal of the third switching element Qc and the storage electrode line 131. The storage electrode line 131 is provided on the lower display panel, and overlaps the output terminal of the third switching element Qc with an insulating material interposed therebetween, allowing for the formation of the step-down capacitor Cstd.

An operation of the liquid crystal display according to the present exemplary embodiment is described herein.

When a gate-on voltage Von is applied to the gate line 121a, the first and second thin film transistors Qa and Qb connected to the gate line 121a are turned on.

Accordingly, the data voltage of the data line 171 is equally applied to the first and second subpixel electrodes 191a and 191b through the turned-on first and second switching elements Qa and Qb. The first and second liquid crystal capacitors Clca and Clcb are charged by a difference of a voltage between the common voltage Vcom of the common electrode 270 and the voltages of the first and second subpixel electrodes 191a and 191b. As a result, a charging voltage of the first liquid crystal capacitor Clca is substantially the same as a charging voltage of the second liquid crystal capacitor Clcb. In this case, a gate-off voltage Voff is applied to the step-down gate line 121b.

When the gate-off voltage Voff is applied to the gate line 121a, and the gate-on voltage Von is simultaneously applied to the step-down gate line 121b, the first and second switching elements Qa and Qb connected to the gate line 121 are turned off, and the third switching element Qc is turned on. Accordingly, the charge of the first subpixel electrode 191a connected to the output terminal of the first switching element Qa flows into the step-down capacitor Cstd. As a result, the voltage of the first liquid crystal capacitor Clca is dropped.

In an exemplary embodiment, the liquid crystal display is driven by frame inversion. For example, a data voltage having a positive (+) polarity may be applied to the data line 171 based on the common voltage Vcom in a current frame, and a negative (−) charge may be collected in the step-down capacitor Cstd after the end of a previous frame. When the third switching element Qc is turned on in a current frame, a positive (+) charge of the first subpixel electrode 191a flows into the step-down capacitor Cstd through the third switching element Qc. As a result, a positive (+) charge is collected in the step-down capacitor Cstd, and the voltage of the first liquid crystal capacitor Clca is dropped. In a next frame, as the third switching element Qc is turned on in a state in which a negative (−) charge is charged in the first subpixel electrode 191a, the negative (−) charge of the first subpixel electrode 191a flows into the step down capacitor Cstd. As a result, the negative (−) charge is collected in the step-down capacitor Cstd, and the voltage of the first liquid crystal capacitor Clca is dropped.

As described above, according to an exemplary embodiment, the charging voltage of the first liquid crystal capacitor Clca may be lower than the charging voltage of the second liquid crystal capacitor Clcb regardless of the polarity of the data voltage. Accordingly, the viewing angle of the liquid crystal display may be improved by differentiating the charging voltages of the first and second liquid crystal capacitors Clca and Clcb.

Figure 12:
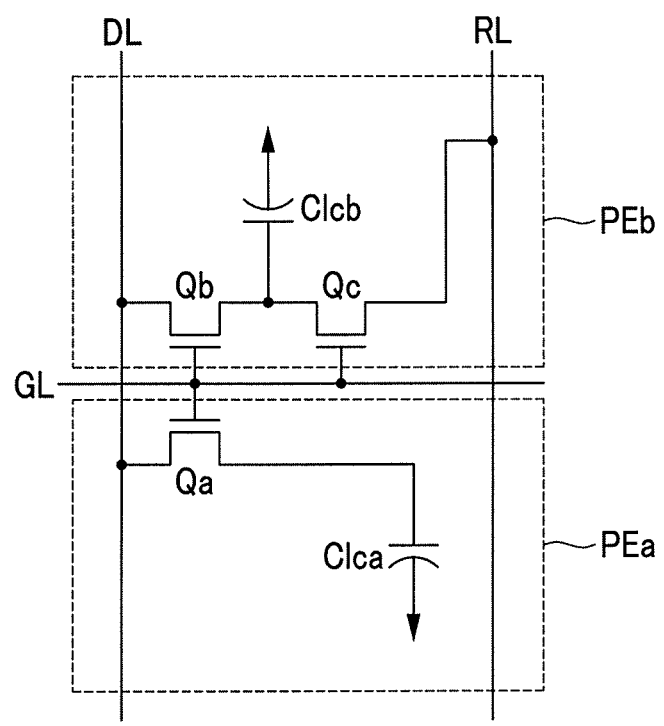
FIG. 12 is an equivalent circuit diagram of a pixel of a liquid crystal display according to an exemplary embodiment of the present invention.
Figure 13:
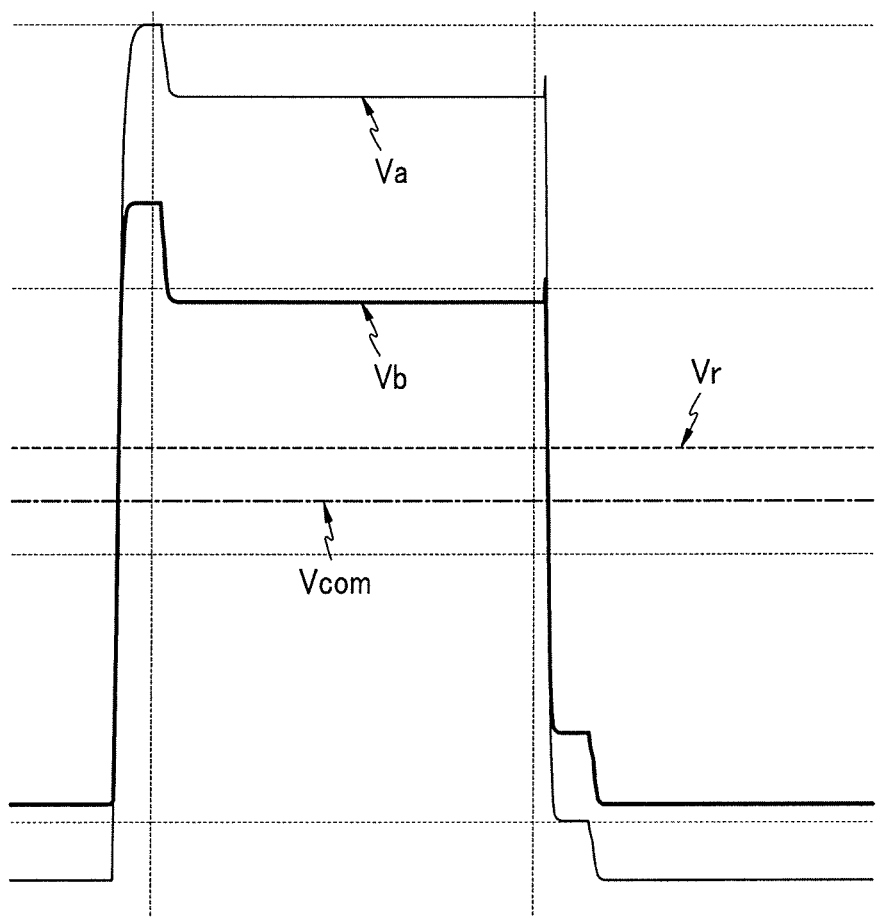
FIG. 13 is a waveform diagram of a signal applied to the pixel of the liquid crystal display according to the exemplary embodiment of FIG. 12.

FIG. 12 is an equivalent circuit diagram of a pixel of a liquid crystal display according to an exemplary embodiment of the present invention. FIG. 13 is a waveform diagram of a signal applied to the pixel of the liquid crystal display according to the exemplary embodiment of FIG. 12.

Referring to FIG. 12, one pixel PX of the liquid crystal display according to an exemplary embodiment of the present invention includes a plurality of signal lines including a gate line GL for transmitting a gate signal, a data line DL for transmitting a data signal, and a reference voltage line RL for transmitting a voltage dividing reference voltage.

The pixel PX further includes a first switching element Qa, a second switching element Qb, and a third switching element Qc, which are connected to the plurality of signal lines, and a first liquid crystal capacitor Clca and a second liquid crystal capacitor Clcb.

The first switching element Qa and the second switching element Qb are connected to the gate line GL and the data line DL, respectively, and the third switching element Qc is connected to an output terminal of the second switching element Qb and the reference voltage line RL.

The first switching element Qa and the second switching element Qb are three-terminal elements such as, for example, a thin film transistor. Control terminals of the first and second switching elements Qa and Qb are connected to the gate line GL, input terminals of the first and second switching elements Qa and Qb are connected to the data line DL, an output terminal of the first switching element Qa is connected to the first liquid crystal capacitor Clca, and an output terminal of the second switching element Qb is connected to input terminals of the second liquid crystal capacitor Clcb and the third switching element Qc.

The third switching element Qc is a three-terminal element such as, for example, a thin film transistor. A control terminal of the third switching element Qc is connected to the gate line GL, the input terminal of the third switching element Qc is connected to the second liquid crystal capacitor Clcb, and an output terminal of the third switching element Qc is connected to the reference voltage line RL.

Referring to FIG. 13, when a gate-on Von signal is applied to the gate line GL, the first switching element Qa, the second switching element Qb, and the third switching element Qc connected to the gate line GL are turned on. Accordingly, the data voltage applied to the data line DL is applied to the first subpixel electrode PEa and the second subpixel electrode PEb through the turned-on first switching element Qa and second switching element Qb, respectively. In this case, the data voltage applied to the first subpixel electrode PEa and the second subpixel electrode PEb may be charged with the same value. According to an exemplary embodiment of the present invention, the voltage applied to the second subpixel electrode PEb is divided through the third switching element Qc serially connected with the second switching element Qb. Accordingly, a voltage Vb applied to the second subpixel electrode PEb may be smaller than a voltage Va applied to the first subpixel electrode PEa. In FIG. 13, Vr represents the reference voltage, and Vcom represents the common voltage.

The voltage charged in the first liquid crystal capacitor Clca and the voltage charged in the second liquid crystal capacitor Clcb are different from each other. As a result, angles at which the liquid crystal molecules are inclined are different from each other in the first subpixel and the second subpixel, and thus, each of the two subpixels have a different luminance. Accordingly, when the voltage charged in the first liquid crystal capacitor Clca and the voltage charged in the second liquid crystal capacitor Clcb are appropriately adjusted, the viewing angle of the liquid crystal display may be improved.

The liquid crystal display according to the exemplary embodiment of FIGS. 11 to 13 represents a thin film transistor having a 1G1D structure, however, exemplary embodiments are not limited thereto. For example, according to exemplary embodiments, the thin film transistor may have a 1G2D structure.

According to exemplary embodiments of the present invention, a liquid crystal display may have improved transmittance, and a domain boundary may be decreased (e.g., the number of domains in a unit pixel may be less than four). As a result, factors that may cause non-uniform alignment of the liquid crystal molecules may be decreased, and the image quality of the liquid crystal display may be improved.

While the present invention has been particularly shown and described with reference to the exemplary embodiments thereof, it will be understood by those of ordinary skill in the art that various changes in form and detail may be made therein without departing from the spirit and scope of the present invention as defined by the following claims.

What is claimed is:

1. A liquid crystal display, comprising:
   a first substrate;
   a first pixel and a second pixel vertically disposed on the first substrate, wherein the first pixel comprises a first pixel electrode, and the second pixel comprises a second pixel electrode;
   a third pixel and a fourth pixel vertically disposed on the first substrate, wherein the third pixel comprises a third pixel electrode, and the fourth pixel comprises a fourth pixel electrode;
   a second substrate facing the first substrate;
   a liquid crystal layer comprising a plurality of liquid crystal molecules, and disposed between the first substrate and the second substrate;
   a first control electrode disposed between the first pixel electrode and the second pixel electrode; and
   a second control electrode disposed between the first pixel electrode and the third pixel electrode,
   wherein the first pixel and the third pixel are horizontally disposed, and the second pixel and the fourth pixel are horizontally disposed,
   wherein the first pixel electrode comprises a first plurality of micro branch portions extending in a first direction, and the second pixel electrode comprises a second plurality of micro branch portions extending in a second direction,
   wherein the third pixel electrode comprises a third plurality of micro branch portions extending in a third direction, and the fourth pixel electrode comprises a fourth plurality of micro branch portions extending in a fourth direction,
   wherein the first direction is different from the second direction,
   wherein the third direction is a same direction as the second direction, and the fourth direction is a same direction as the first direction,
   wherein most of the first plurality of micro branch portions are aligned with one another in a same layer, and
   wherein the second control electrode is connected to the first control electrode.

2. The liquid crystal display of claim 1, wherein the first control electrode is disposed at a same layer as the first pixel electrode or the second pixel electrode.

3. The liquid crystal display of claim 1, wherein the first control electrode is formed of a same material as the first pixel electrode or the second pixel electrode.

4. The liquid crystal display of claim 1, wherein a uniform voltage is applied to the first control electrode or the first control electrode comprises a floating electrode.

5. The liquid crystal display of claim 1, wherein the plurality of liquid crystal molecules have a pretilt direction toward a center of a unit region including the first pixel, the second pixel, the third pixel, and the fourth pixel.

6. The liquid crystal display of claim 5, further comprising:
a plurality of unit regions, including the unit region, repeatedly arranged in the liquid crystal display.

7. The liquid crystal display of claim 6, wherein the plurality of unit regions are repeatedly arranged in a horizontal direction in a first row and a second row, and the thurth pixel in the first row and the first pixel in the second row are adjacently disposed.

8. The liquid crystal display of claim 1, wherein the first pixel and the second pixel receive gate signals from different gate lines.

9. The liquid crystal display of claim 1, wherein the second control electrode is disposed at a same layer as the first pixel electrode or the third pixel electrode.

10. A liquid crystal display, comprising:
a first substrate;
a first pixel and a second pixel horizontally disposed on the first substrate, wherein the first pixel comprises a first pixel electrode, and the second pixel comprises a second pixel electrode;
a third pixel and a fourth pixel horizontally disposed on the first substrate,
wherein the third pixel comprises a third pixel electrode, and the fourth pixel comprises a fourth pixel electrode;
a second substrate facing the first substrate;
a liquid crystal layer comprising a plurality of liquid crystal molecules, and disposed between the first substrate and the second substrate;
a first control electrode disposed between the first pixel electrode and the second pixel electrode; and
a second control electrode disposed between the first pixel electrode and the third pixel electrode,
wherein the first pixel and the third pixel are vertically disposed, and the second pixel and the fourth pixel are vertically disposed,
wherein the first pixel electrode comprises a first plurality of micro branch portions extending in a first direction, and the second pixel electrode comprises a second plurality of micro branch portions extending in a second direction,
wherein the third pixel electrode comprises a third plurality of micro branch portions extending in a third direction, and the fourth pixel electrode comprises a fourth plurality of micro branch portions extending in a fourth direction,
wherein the third direction is a same direction as the first direction, and the fourth direction is a same direction as the second direction,
wherein the first direction is different from the second direction,
wherein most of the first plurality of micro branch portions are disposed at a same layer as one another, and
wherein the second control electrode is connected to the first control electrode.

11. The liquid crystal display of claim 10, wherein the plurality of liquid crystal molecules have a pretilt direction toward a center of a unit region including the first pixel, the second pixel, the third pixel, and the fourth pixel, and the liquid crystal display further comprises a plurality of unit regions, including the unit region, repeatedly arranged in a horizontal direction in a first row and a second row, and
the fourth pixel in the first row and the first pixel in the second row are adjacently disposed.

12. The liquid crystal display of claim 10, wherein the second control electrode is disposed at a same layer as the first pixel electrode or the third pixel electrode.

13. The liquid crystal display of claim 1, wherein each of the first pixel and the second pixel includes less than four domains.

14. The liquid crystal display of claim 1, wherein
the first pixel electrode and the second pixel electrode each comprise a first subpixel electrode and a second subpixel electrode,
wherein voltages applied to the first subpixel electrode and the second subpixel electrode are different from each other,
wherein the second subpixel electrode of the first pixel is adjacent to the first subpixel electrode of the second pixel.

15. The liquid crystal display of claim 14, wherein the first control electrode is disposed between the second subpixel electrode of the first pixel and the first subpixel electrode of the second pixel.

* * * * *